(12) United States Patent
Stewart

(10) Patent No.: US 6,195,103 B1
(45) Date of Patent: Feb. 27, 2001

(54) VOLATILITY PLOT AND VOLATILITY ALERT FOR DISPLAY OF TIME SERIES DATA

(76) Inventor: Hugh Bruce Stewart, 1878 Rte. 25, Ridge, NY (US) 11961

( * ) Notice: Subject to any disclaimer, the term of this patent is extended or adjusted under 35 U.S.C. 154(b) by 0 days.

(21) Appl. No.: 08/972,662

(22) Filed: Nov. 18, 1997

Related U.S. Application Data

(60) Provisional application No. 60/031,360, filed on Nov. 19, 1996.

(51) Int. Cl.[7] .................................................. G06F 15/00
(52) U.S. Cl. ............................................................. 345/440
(58) Field of Search .................................... 345/440, 338, 345/968; 705/35, 40; 707/3, 4, 102, 103, 104, 907

(56) References Cited

U.S. PATENT DOCUMENTS 6,020,898 * 2/2000 Saito et al. .............................. 345/440
6,023,280 * 2/2000 Becker et al. ......................... 345/440

OTHER PUBLICATIONS

Recurrence Plots of Dynamical Systems, Eckmann et al., Europhysics Letters, 1987, vol. 4, No. 9, pp. 973–977.*
Topological Analysis And Synthesis Of Chaotic Time Series, Mindlin et al., Physica D, 1992, vol. 58, p. 229–242.*
Embeddings and Delays As Derived From Quantification Of Recurrance Plots, Zbilut et al., Physics Letters A, 1992, vol. 171, pp. 199–203.*
A New Approach To Testing For Chaos, With Applications In Finance And Economics, Gilmore, International Journal Of Bifurcation and Chaos, 1993, vol. 3, No. 3, pp. 583–587.*
Dynamical Assessment Of Physiological Systems And States Using Recurrence Plot Strategies, Webber et al., American Journal of Physiology, 1994, vol. ?, pp. 965–973.*
Properties of AE Data And Bicolored Noise, Takalo et al., Journal of Geophysical Research, 1994, vol. 99, No. A7, pp. 13,239–13,249.*

* cited by examiner

*Primary Examiner*—Phu K. Nguyen
(74) *Attorney, Agent, or Firm*—Carmody & Torrance LLP

(57) ABSTRACT

A computer software system for displaying time series data as a color image in which one axis of said image represents sequential time and a second axis represents an offset in time from the time represented in said first axis. The computer software resides on a computer having at least one storage medium, at least one CPU, a power means, and an operating system.

12 Claims, 8 Drawing Sheets

(2 of 8 Drawing Sheet(s) Filed in Color)

VOLATILITY PLOT AND VOLATILITY ALERT FOR DISPLAY OF TIME SERIES DATA

CROSS REFERENCE TO RELATED APPLICATIONS

This application is a continuation of the provisional patent application Ser. No. 60/031,360 filed on Nov. 19, 1996 titled Volatility Plot and Volatility Alert For Display of Time Series Data.

BACKGROUND OF THE INVENTION

1. Field of the Invention

This invention relates to graphical display of time series data, both from historical records and in real time.

2. Description of the Prior Art

When analyzing time series data, it is often important to evaluate not just the values of the data at different times, but also the fluctuations, that is, the changes from one observation time to the next. For example, in assessing the fair price of an option or a futures contract on a financial instrument, the most important determining factors are the current price of the underlying instrument, and the volatility of the underlying instrument. The volatility is the typical magnitude of price fluctuation from one time to the next.

A wide-spread practice in financial market analysis is to evaluate volatility numerically through the use of statistical models based on the concept of a random walk. These random walk models all depend on the assumption that the statistical distribution of price changes is a normal or log-normal distribution. However, the actual distribution of price changes in financial market data is known to be inconsistent with the assumption of normality or log-normality. In fact distributions of price changes in financial market data typically show strong leptokurtosis; that is, the distributions are strongly peaked near zero price change, and have fat tails, meaning that large price changes in either direction occur more often than they would in a normal or log-normal distribution. Alternative proposals for models based on other assumed forms of price change distribution have been made, but analysis of these alternative models is much more difficult and less complete than for the random walk models, and the alternative models have not been accepted and used in practice.

In such a situation where a widely used model is founded on a doubtful assumption, it would seem prudent to have some other means of assessing volatility which does not depend on any assumptions about the nature of the statistical distribution of price changes. Graphical display is one very effective method for comprehending numerical data directly, without reliance on modeling assumptions. However, the time-honored method of plotting time series data as a graph, with the data drawn as line segments or stair steps connecting data points, while effective for price data, is not so effective for representing price change data in a way that can be quickly and accurately comprehended. Furthermore, the conventional two-dimensional graph uses the display area in an inefficient manner: the information is contained in the lines or curves drawn on the graph, and the remaining blank area of the graph, both above and below the lines or curves, is needed to convey the information in the graph lines, but does not itself contain any information and is therefore is a sense wasted space. When it becomes necessary to evaluate rapidly a large number of time series e.g. of different financial instruments, this inefficient use of display area becomes a crippling disadvantage.

In "Recurrence Plots of Dynamical Systems" by Eckmann et al., *Europhysics Letters,* Vol. 4, No. 9, pp. 973–977 (1987), a method is disclosed for displaying recurrences, or close returns in phase space, of time series data using a two-dimensional image. Each axis of the image represents time, divided into discrete intervals. The image therefore consists of a grid of small squares, with each small square marked (black) or unmarked (white) depending on the values of the time series at the two corresponding times. A small square is marked (black) if the two values of the time series at the corresponding times are very close to each other; otherwise the small square is unmarked (white). (More generally, Eckmann et al. compare not just values at the two times, but rather they compare patterns of some specified length leading up to each of the two times; the comparison is made by treating each pattern as a vector in a multidimensional phase space, and computing the distance separating the two vectors.) The resulting two-dimensional image is called a recurrence plot.

Variants of this idea have also been disclosed (for example on the World Wide Web at http://www.scri.fsu.edu/~nayak/chaos/recur.html) using a plurality of colors to mark the small squares, with the colors chosen to represent the distance separating the two time series values or patterns. In accord with the specific goal of finding recurrences in time series data, colors are assigned to a range of distances which are all considered close, whereas distances not considered close always result in an unmarked square. Hot or bright colors represent very close recurrences, while cool or dark colors stand for recurrences which are close but not very close.

Several modifications or applications of recurrence plots have been disclosed, e.g. in "Topological analysis and synthesis of chaotic time series" by Mindlin and Gilmore, *Physica D,* Vol. 58, pp. 229–242 (1992); "Embeddings and delays as derived from quantification of recurrence plots" by Zbilut and Webber, *Physics Letters A,* Vol. 171, pp. 199–203 (1992); "A new approach to testing for chaos, with applications in finance and economics" by Gilmore, *International Journal of Bifurcation and Chaos,* Vol. 3, No. 3, pp. 583–587 (1993); "Dynamical assessment of physiological systems and states using recurrence plot strategies" by Webber and Zbilut, *American Journal of Physiology,* Vol. ?, pp. 965–973 (1994); "Properties of AE data and bicolored noise" by Takalo et al., *Journal of Geophysical Research,* Vol. 99, No. A7, pp. 13,239–13,249 (1994). In every instance the teaching specifies that only close distances should be marked, and all distances which are not close should remain unmarked.

The recurrence plot is a very efficient display method, conveying a great deal of information in the display surface area utilized. There is still some inefficiency resulting from the fact that all pairs of times having widely separated distances result in unmarked squares; these convey less information than is found in the colored squares, which distinguish among a plurality of ranges of small distances. However, this is entirely appropriate to the objective of identifying close recurrences in time series data.

Recurrence plots are very useful for identifying recurrences in time series data. However, the application of this display method to evaluating volatility has not been practiced. Indeed, as taught, the method would constitute an ineffective means for evaluating volatility, since it would only discriminate among the smaller price changes (or smaller differences in price changes), while moderate, large, and very large price changes (or differences in price changes) would all be lumped into one category, resulting in unmarked squares.

What is needed is a graphical display means that presents time series data in a form that permits rapid and accurate evaluation of changes in the data from one time to the next, discriminating clearly and strongly among small, moderate, and large price changes, while making efficient use of display surface area so that a plurality of time series can be visualized simultaneously within a limited total display area, such as a computer monitor.

SUMMARY OF THE INVENTION

An objective of this invention is to display time series data graphically in a form which permits rapid and accurate analysis of volatility, that is, the fluctuations from one time to the next, while making efficient use of the display surface area.

Another objective of the present invention is to display time series data graphically in real time on a computer monitor in such a way that the display is updated quickly as each new datum arrives at the computer.

A further objective of this invention is to display data from a plurality of time series graphically on a computer monitor is such a way that the display is updated quickly as each new datum from each of the time series arrives at the computer, and such that the display makes immediately apparent which time series exhibit unusually large volatility at any moment.

These needs are met by a method based on the two-dimensional image approach of the recurrence plot, but using colors to represent data values in a manner which is opposite to the use of color in the recurrence plot. The method comprises the steps of converting time series data to a series of fluctuations by subtracting from each value the value at the immediately preceding time and storing all the difference values; computing the distance between patterns of fluctuations for every pair of times; converting the distances to colors; and applying each color to the appropriate small square in the display. In the case of recorded historical data, the colors for all small squares in all appropriate time intervals are stored appropriately arranged in computer memory and then sent as a single transmission to the display. The resulting display, using either a computer monitor or a color printer, is referred to as a volatility plot.

In the case of real time data display, the method comprises the steps of converting the most recent datum to a fluctuation by subtracting the previous time value and storing the differences; computing the distance between the most recent pattern of fluctuations and the pattern of fluctuations at previous times in a specified range; converting the distances to colors; transferring the colors so determined as a single column of small squares into an intermediate data structure holding a plurality of columns of squares in a circular queue; then transferring all columns of colors from the queue to the computer monitor in two separate groups, arranged to simulate the appearance of a scrolling color image. The resulting display is referred to as a scrolling volatility plot.

In the case of multiple real time data series, the method comprises the following steps: constructing a small scrolling volatility plot for each time series, with each scrolling image displayed at a different location on the computer monitor; checking for user input to select one of the scrolling volatility plots; and responding to the user selection by displaying more extensive and detailed information about the corresponding instrument. The resulting display is referred to as a volatility alert.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

First Embodiment
100—reading (100) price data from archive after entering
102—first computing (102) fluctuations/first distances or standardized returns
104—second computing (104) distance from fluctuation pattern at time I to fluctuation pattern a time I-j
106—multiplying (106) distance by scale factor
108—third computing (108) color from scaled distance and applying to column I, row j
110—first (110) determining last row is NO and second determining next row
111—repeating steps (104) through (108)
112—third (112) determining last row is YES and fourth determining next column is NO and fifth determining next column, top row
114—sixth (114) determining last row is YES and seventh determining next column is YES and sending image data to display and exiting Second Embodiment
200—receiving (200) latest price at time I from data feed after entering
202—first computing (202) fluctuation at time I
204—second computing (204) distance from fluctuation pattern at time I to fluctuation pattern at time I-j
206—multiplying (208) distance by scale factor
208—third computing (208) color from scaled distance and store in pixel data queue column k, row j
210—first determining (210) last row is NO and first proceeding to next row in queue
211—repeating steps (204) thru (208)
212—second determining (212) last row is YES and transferring pixel queue columns 1 thru k to display, right aligned
214—third determining (214) last column is YES and resetting to first column in queue
215—repeating steps (200) thru (212)
216—fourth determining (216) last column is NO and transferring pixel queue columns k+1 thru end of display, left aligned
218—second proceeding (218) to next column in queue
219—repeating steps 200 thru 212

Third Embodiment
302—first entering and first determining that new data IS present and reading (302) data for one instrument
306—first determining (306) that another instrument IS present and proceeding to the next instrument
307—repeating steps (302) thru (330)
308—second determining (308) that another instrument IS NOT present and clicking a mouse cursor in volatility alert
309—third determining that volatility alert is NO and repeating steps 302 thru 304
310—fourth determining (310) that another instrument IS present and identifying which instrument is selected under the mouse cursor
312—obtaining (312) and displaying additional data pertaining to the selected instrument
313—repeat ing steps (300) thru (310)
314—first computing (314) fluctuation at time I 318—second computing (312) distance from fluctuation pattern at time I to fluctuation pattern at time I-j 320—computing (320) color from scaled distance and storing in pixel data queue column k, row j 322—second determining (322) that last row is NO and proceeding to next row in queue 324—second determining (322) that last row is YES and transferring pixel queue columns 1 thru k to display, right aligned in sub window 326—third determining (326) that last column is YES and resetting to first column in queue 328—fourth determining (328) that last column is NO and transferring pixel queue columns k+1 thru end to display, left aligned in subwindow k+1

330—fifth determining (330) next column in queue

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DESCRIPTION OF THE PREFERRED EMBODIMENT

I. Volatility Plot

Time series data is a sequence of numerical values ordered consecutively by time. Let the data be $X(t_i)$, observed and recorded at successive times $t_i$, I=1,2,3, . . . I. The times $t_i$ may be separated by equal or unequal intervals. The difference between a pair of consecutive times is a time step.

A volatility plot represents the fluctuations in a time series of quantitative data as a rectangular color image on a computer display. The computer display may be a color monitor, and in this case the volatility plot image consists of a rectangular array of pixels, or of a rectangular array of small squares of pixels; in the latter case, the number of pixels in each small square is uniform over the volatility plot. Alternatively, the computer display may be a color printer, and in this case the volatility plot image consists of a rectangular array of small colored squares printed on paper or similar medium by the color printer; the dimensions of a small square are uniform over the volatility plot.

Figure 1:
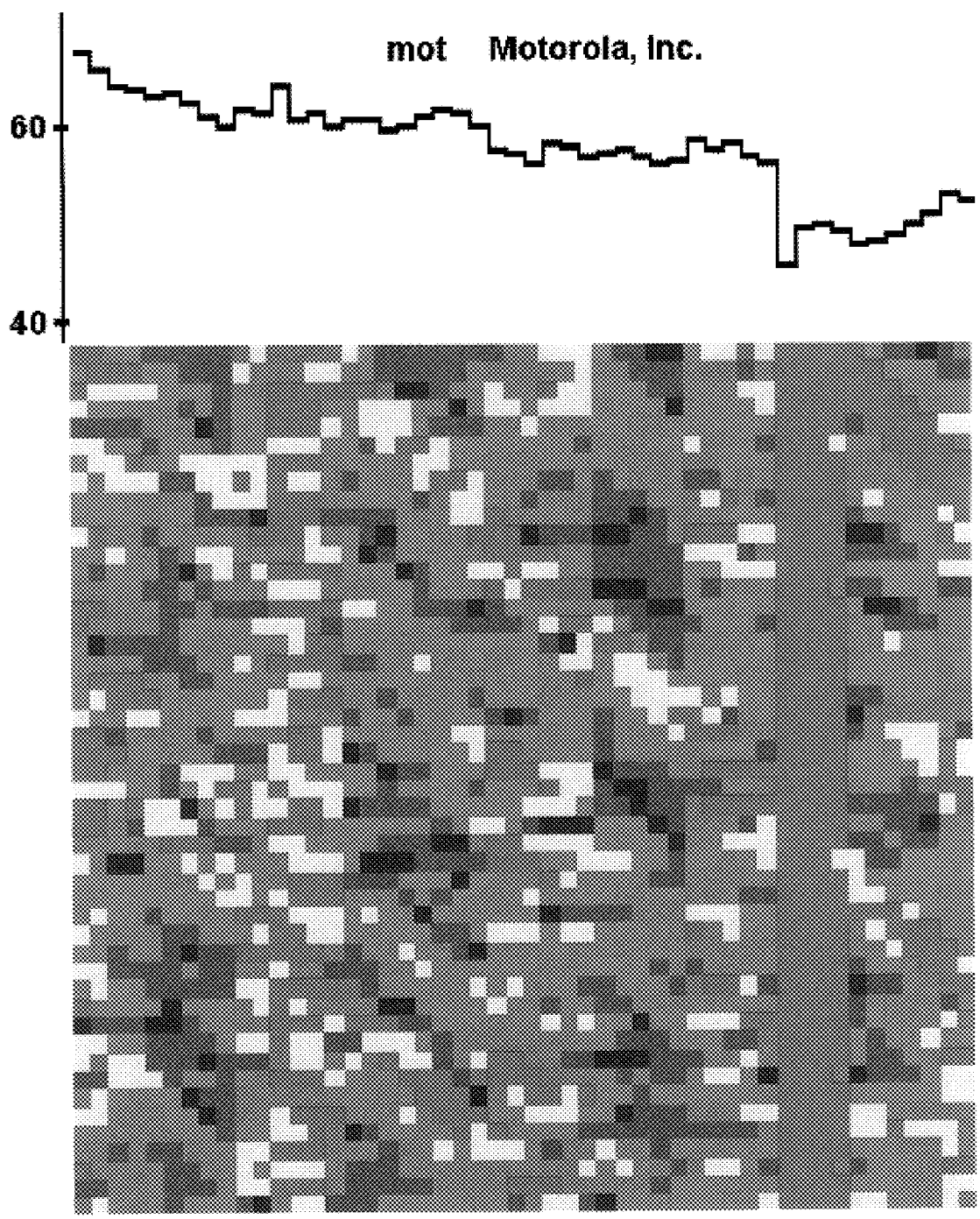
FIG. 1 is an illustration incorporating a volatility plot of time series data, together with a conventional graph of the same data.

FIG. 1 shows the appearance of a volatility plot, using as example data the daily closing prices of a share of Motorola, Inc. stock over a period of fifty trading days. The volatility plot is the block of 2500 small colored squares in FIG. 1. Above the volatility plot in FIG. 1 is a conventional graph of the same data: the graph is drawn as a flat line segment for each day at the level of that day's closing price, connected by a vertical line to the level of the next day's closing price. At the left edge of the conventional graph is shown the price scale (in dollars per share) used to determine the vertical position of each flat line segment.

The color in each small square in a volatility plot is determined by values of $X(t_i)$ at two different times in the time series. The first time is indicated by position on the horizontal axis, which measures sequential time. In FIG. 1 the horizontal time scale of the volatility plot is identical with the time scale of the conventional graph. The second time is indicated by position on the horizontal axis together with position on the vertical axis, which measures offset time; the second time is equal to the first time minus a number of time steps equal to the row index of the small square, counted from the top edge of the volatility plot image.

Figure 2:
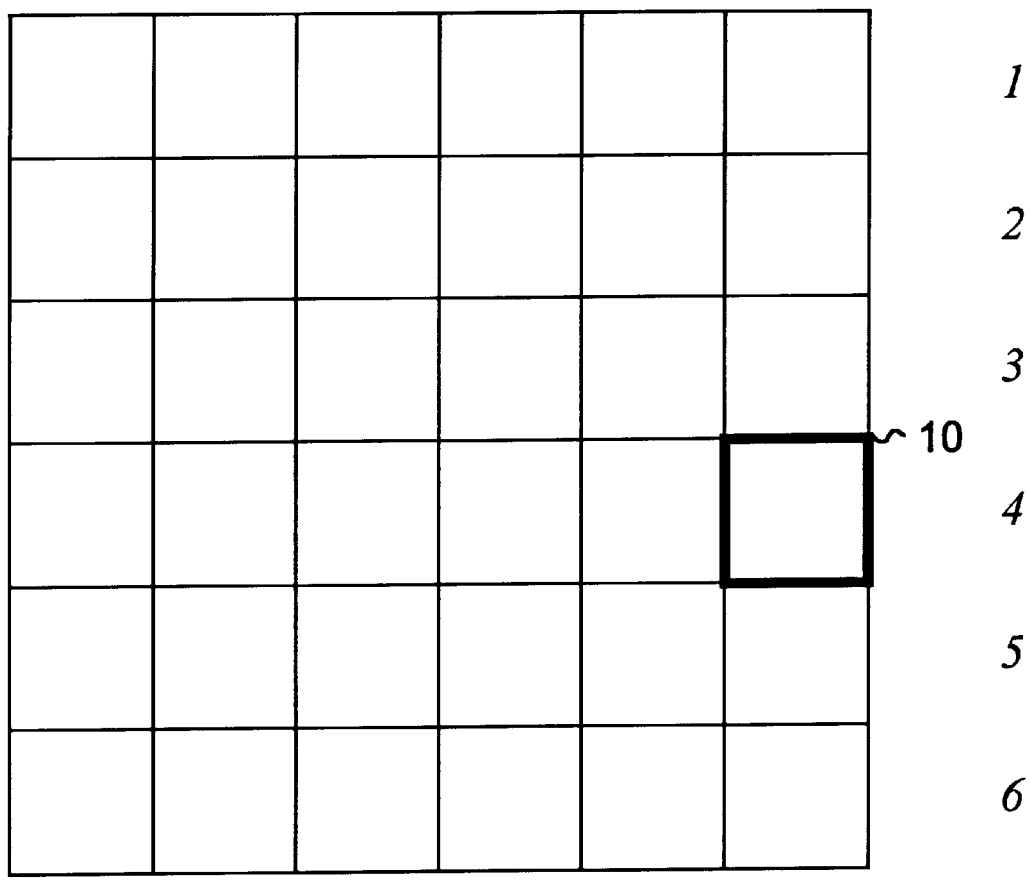
FIG. 2 is a schematic representation of a volatility plot, identifying the indexing of sequential time and of time offset.

The time coordinates of a volatility plot are indicated on FIG. 2, which shows a schematic illustration of a volatility plot spanning six sequential times horizontally and six time offsets vertically. Each square box in the grid of FIG. 2 represents schematically a small colored square in a volatility plot, for example FIG. 1. The color in each small square is determined from the values $X(t_i)$ of the time series at two distinct times. The first time is a sequential time, with the indices I-5 through I across the top of the schematic in FIG. 2 corresponding to the sequential times $t_{i-5}$ through $t_i$. Each such sequential time is used as the first time in determining color for each small square in the column of squares under its index. The indices down the right side of the schematic correspond to time offsets; each such time offset is used in determining color for each small square in the row next to its index. Thus the highlighted small square 10 in FIG. 2, lying in the column with index I and the row with index 4, corresponds to a first time $t_i$ and to a second time $t_{i-4}$. The precise manner in which a color is determined for each small square from the values of the time series at the two times will be explained in detail below.

Figure 3:
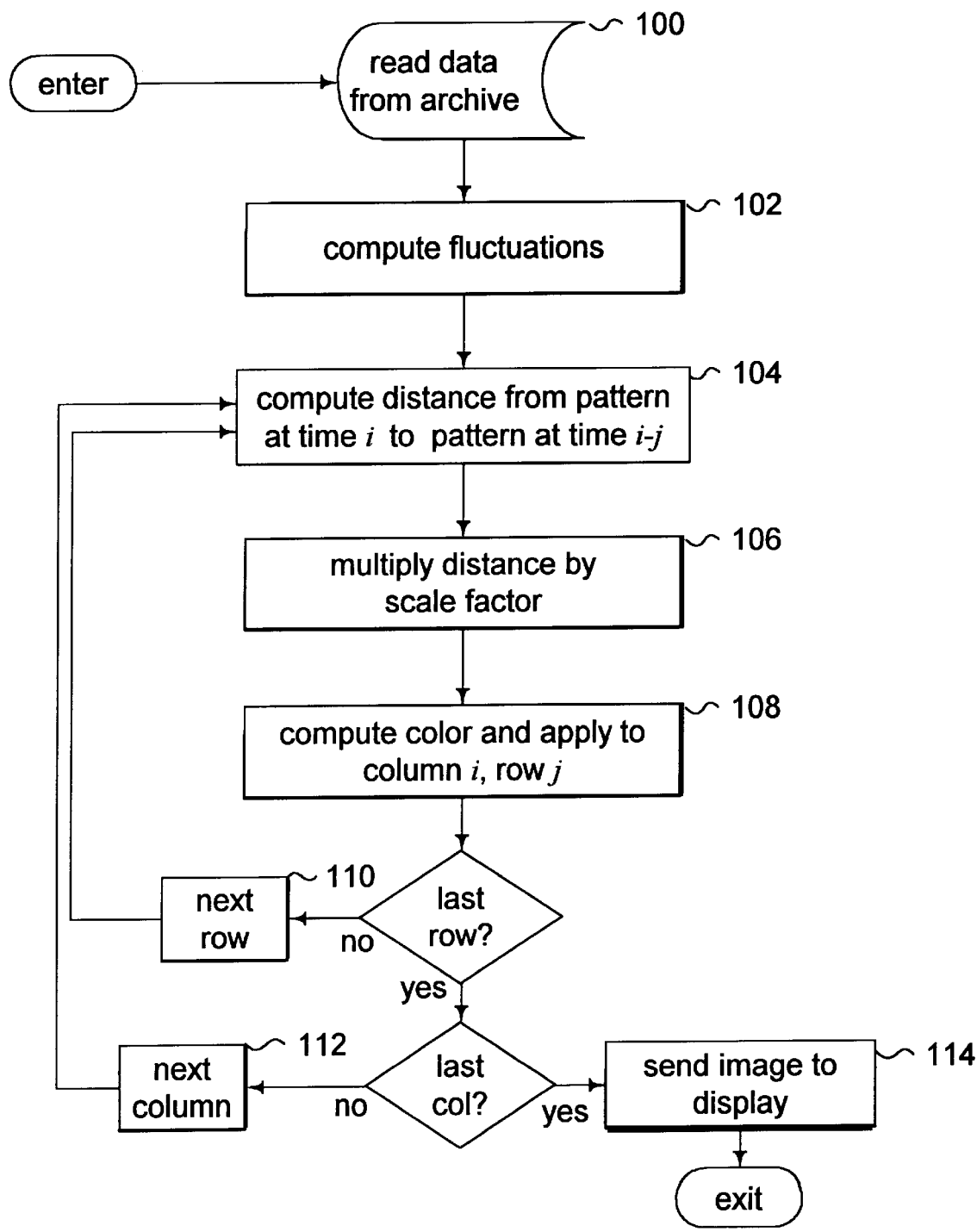
FIG. 3 is a flowchart illustrating the steps performed in practicing the volatility plot.

FIG. 3 shows a flowchart of a computer program which implements the volatility plot for recorded historical data. The program first reads 100 the time series data to be plotted from an archive. In a preferred embodiment for financial market data, the time series data would be the daily closing prices of a financial instrument; or for intra day data the tick prices, or the average price over short time intervals such as one minute. In order to fully utilize the rectangular image area, the time series data should extend into the past prior to the first time on the horizontal axis of sequential time by a number of steps equal to the number of rows in the image.

The program next computes 102 the first differences of the time series data $X(t_i)$:

$$x(t_i)=X(t_i)-X(t_{i-1})$$

Alternatively, in a preferred embodiment for financial market data, the program computes 102 the relative changes or standardized returns from the time series data $X(t_i)$:

$$x(t_i)=[X(t_i)-X(t_{i-1})]/X(t_{i-1})$$

In either case, the $x(t_i)$ will be referred to herein as the fluctuations.

The volatility plot represents the fluctuations $x(t_i)$ of the time series $X(t_i)$ by assigning a color to each pixel or small square. In a preferred embodiment for a computer with a single microprocessor operating sequentially, the computation of a color and its application to the image is done sequentially for each column I in the image, and within each column sequentially for each row j of the image. (This ordering of operations is not strictly necessary for the volatility plot, but is desirable for software compatibility with the scrolling volatility plot as described below.) The color in each column I and each row j is determined from a comparison of a short pattern of the fluctuations $x(t_i)$ leading up to the first time $t_i$ with a short pattern of the fluctuations leading up to the second time $t_{i-1}$. Specifically, let L be an integer referred to as the pattern length; typically the value of L might be in the range from 3 to 6. Usually the value of L is uniform over the entire volatility plot. The L successive values $$x(t_{i-j-L+1}), x(t_{i-L+2}), \ldots, x(t_{i-1}), x(t_i)$$

culminating at $x(t_i)$ are compared with the L values $$x(t_{i-j-L+1}), x(t_{i-j-L+2}), \ldots, x(t_{i-j-1}), x(t_{i-j})$$

culminating at $x(t_{i-j})$

The comparison is made by treating each set of L numbers as the coordinates of a point in a space of L dimensions, and computing a measure of the distance between the two points. For example, if the Euclidean distance is used, the program computes 104:

$$D(i, j, L) = \left\{ \sum_{l=1}^{L} [x(t_{i-1}) - x(t_{i-j-1})]^2 \right\}^{1/2}$$

The next step is to compute 106 from this distance a color for the pixel in column I, row j. For example, if six distinct colors are used for the small squares, a scaling factor s may be chosen so that when multiplied by D most values of sD fall in the range 0 through 6. The value of s will depend on the average magnitude of the fluctuations $x(t_i)$. While it is possible to determine a value of s for each time series, it is often more useful to use a fixed values of s for all time series in the same category. Thus one value of s would be used for daily returns of NYSE stocks, another value of s for daily returns of NASDAQ stocks, and yet another value for the 5-minute returns of NASDAQ stocks. In each case s would be chosen so that most values of sD (over all relevant times and all instruments in a category) lie in the range 0 to 6, and ideally with roughly 17% of all values lying in the range from 5 to 6.

Other formulas for computing a color from the distance may also be used. The essential properties of any such formula are that small distances produce dark or cool colors, while large distances produce bright or hot colors. It is also desirable that the formula should, for a large group of comparable instruments, yield roughly equal numbers of squares of each color.

In a preferred embodiment, six distinct colors are used, and are assigned to values of sD as follows:

| | |
|---|---|
| 0 ≤ sD < 1 | black |
| 1 ≤ sD < 2 | blue |
| 2 ≤ sD < 3 | cyan |
| 3 ≤ sD < 4 | green |
| 4 ≤ sD < 5 | yellow |
| 5 ≤ sD | red |

Although color monitors are capable of displaying a more finely graded color scale, this relatively coarse scale is more useful because the resulting image conveys information more effectively to the human observer. In a preferred embodiment for display on a color monitor, the color cyan should have less than full value in hue-saturation-value coordinates, so that it does not appear brighter than green. In a preferred embodiment for generating hard copy on a color printer, all colors should be as full saturation and value, as only these colors will be printed as solid colors uniformly over each small square.

The next step is to apply 108 the color determined in step 106 to the small square in the appropriate position within the volatility plot image, namely in the pixel or small square in column I and row j. The program stores information about the color and its position within the image, in a format appropriate to the display device.

In some cases, for example when historical data at times before the earliest sequential time represented on the horizontal axis are not available, no distance can be computed in step 104. When this happens, the corresponding small square is left blank. For display on a monitor, blank may mean applying the color black. In the case of display on a printer, blank means that no color is applied, resulting in a small square having the same color as the printing medium (e.g. white for printing on paper).

Having completed the operations for column I and row j, the program advances 110 to the next row in the image; or, if row j is the last row in column I the program advances 112 to the next column and begins again with the first row. Finally, when the last row of the last column is processed, the program sends 114 the completed image, as accumulated in computer memory over repeated applications of step 108, to the display and the procedure is finished.

Interpretation of the Image

When a time series is displayed as a volatility plot, the most prominently visible features of the image are vertical and diagonal lines of hot colors (yellow, red). Each such vertical line includes a column I corresponding to time $t_i$ at which the value $X(t_i)$ changes by a large amount either up or down from one time $t_{i-1}$ to the next $t_i$. Such a vertical line will typically have a thickness at least equal to the pattern length L, because each large change will impact the distance $D(i, j, L)$ for L consecutive values of I. Within such a vertical line, individual squares may vary in color, for example showing a mix of predominantly red and yellow squares, or yellow with green squares. The proportions of the different colors within such a vertical line give a finer indication of the magnitude of the sudden change at time $t_i$; a solid red line indicates a larger change than a line of mixed red and yellow.

In addition to such a vertical line, each large jump in the value of $X(t_i)$ generates a diagonal line of hot colors extending down and to the right at forty-five degrees. This arises because all the pixels or small squares along a one-square-wide diagonal in this direction have the same value of the index I-j. Like the vertical line, the diagonal line may have a mix of colors indicating the magnitude of the jump at time $t_i$, and will be thickened by the value of the pattern length L.

Further information may be read at the intersections of vertical and diagonal lines emanating from different jumps in the value of $X(t_i)$. For example, if the pixels or small squares at the intersection of a vertical hot line and a diagonal hot line are cooler than the colors nearby in either line, then the two corresponding jumps were in the same direction (both up or both down).

The prominent vertical and diagonal lines divide the volatility plot into various regions of triangular or rhomboidal shape. The average color within each such triangle or rhomboid indicates the average volatility during an episode between major jumps. In addition, the mix of colors in such a region may have a distinctive texture. For example, short horizontal stripes of cool colors (black, blue) usually indicate time intervals during which $X(t_i)$ did not move. The average length of such short horizontal stripes is one kind of texture, which indicates the typical time period over which no change in $X(t_i)$ was observed.

These short horizontal stripes also appear in recurrence plots of time series data generated by a deterministic dynamical system, that is, a system evolving according to rules make its immediate future predictable from knowledge of its instantaneous dynamical state. In a recurrence plot, these short horizontal stripes are usually interpreted as indicating short-term predictability based on dynamical analogy. By contrast, a volatility plot displays information about any time series, whether or not originating from a deterministic dynamical system. In a recurrence plot, only pixels or small squares corresponding to very small distances are shown. That is, the black colored squares of the volatility plot are shown in the recurrence plot; pixels or small squares corresponding to moderate and large distances (blue through red in the volatility plot) appear blank (on paper, white) in the recurrence plot. Thus the volatility plot conveys vastly more information than a recurrence plot. For this reason volatility plots are useful for visualizing many types of time series data, whereas the usefulness of recurrence plots is limited to analysis of a specific category of time series data, namely time series generated by a deterministic dynamical system following evolutionary rules which make it perfectly predictable in the short term.

The volatility plot shows prominent red and yellow vertical and diagonal lines at times of large change, and less prominent green and cyan lines for lesser changes. These lines divide the volatility plot into primary and secondary regions of triangular and rhomboidal shape having different average colors and varying textures. The arrangement of these lines and regions, their size, sequence, and frequency, convey much detailed information about episodes and shifts in volatility over time, in a form readily processed by the human visual pattern recognition system. Because the horizontal axis of the volatility plot is time, features of the volatility plot can be directly related to a conventional graph of the same or related data plotted above the volatility plot on the same time scale. For example, episodes of high and low volatility can be compared with periods during which the price of a financial instrument showed either a strong up or down trend, or vacillated.

II. Scrolling Volatility Plot

A scrolling volatility plot is a display of a volatility plot on a color monitor using real-time data arriving sequentially at the microprocessor which controls the color monitor. As each new data value in the time series arrives at the microprocessor, the recent pattern of fluctuations is compared with earlier patterns of fluctuations. A fresh column of color pixels or small squares is displayed at the rightmost edge of the volatility plot, while the remaining portion of the volatility plot is redrawn from previously computed and stored data to the monitor shifted one column to the left, with the leftmost column of the previous display discarded.

When the data arrive frequently and the updating of the display is done efficiently, the volatility plot appears to scroll smoothly from right to left, with the latest data always located in the same position at the rightmost edge of the scrolling volatility plot.

In order to achieve efficient updating of the display, both the incoming quantitative data and the rectangular array of pixel color data for each time series are stored in computer memory. The array of pixel colors is stored in the form transferred most rapidly from computer memory to the graphics system which controls the color monitor. The best form will depend on the particular computer hardware and operating system software being used. Typically, rapid transfer of pixel colors from computer memory to the color monitor is achieved for a rectangular array of pixels stored in consecutive memory locations. This operation is commonly referred to as bit blitting. To insure the appearance of rapid scrolling of a volatility plot on the monitor, the arrangement of pixel colors in memory will not correspond exactly to their arrangement on the color monitor. If these two arrangements were the same, then the entire array of pixel color data would have to be shifted in computer memory from time to time, and the processor time required to shift the pixel color data in memory would delay their transfer to the monitor.

Pixel Data Queue

To avoid shifting the pixel color data in computer memory, the pixel color data for a single volatility plot are stored in a kind of circular queue. The arrangement of data in the queue, and its relation to the arrangement on the color monitor display are shown schematically in FIG. 4, using as an example a display of four rows and eight columns of small squares, and a pixel data queue of the same size. In general, the pixel data queue could have more rows and/or columns that the display.

Figure 4:
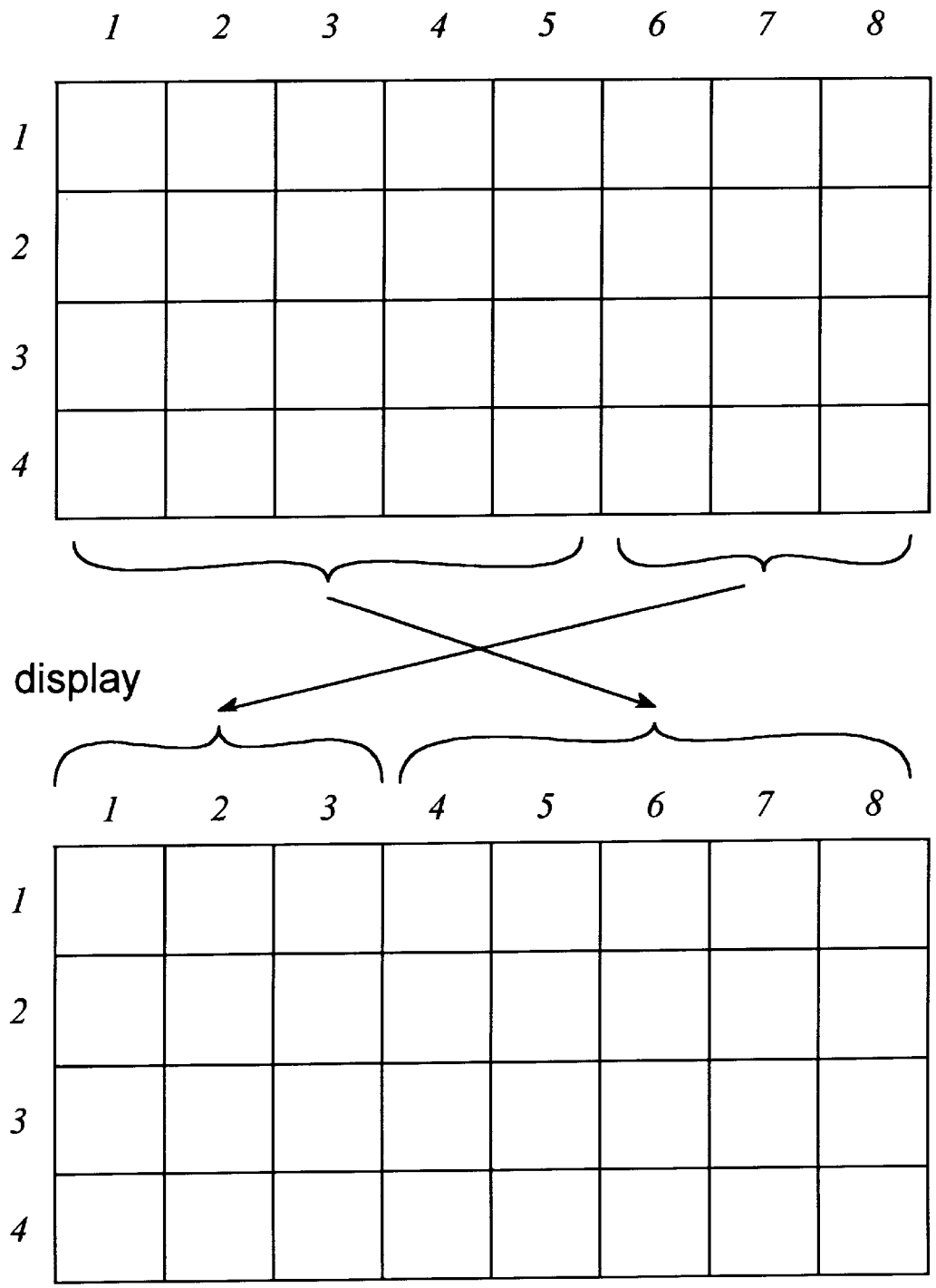
FIG. 4 is a schematic representation of the circular pixel data queue used in practicing the scrolling volatility plot.

The upper part of FIG. 4 shows schematically the arrangement of pixel data in the queue. Here each box represents storage in computer memory for one color value (for one pixel or small square in the volatility plot). Rows in the queue correspond to rows in the volatility plot, as indicated down the left side. However, column numbering in the queue will usually differ from column numbering in the volatility plot display. The numbers in FIG. 4 above the columns of the pixel data queue are indices of data storage locations in the queue, not indices of the data observation times $t_i$. The index k will refer to a column in the pixel data queue.

The lower part of FIG. 4 shows schematically how the same data should appear rearranged as a volatility plot image and placed at a fixed location on the color monitor, i.e. with the most recent (rightmost) column of color pixel data displayed in the same location on the monitor for every time $t_i$. Here each box represents a pixel or small square on the color monitor. The numbers down the left side in the lower part of FIG. 4 are vertical coordinates in the pixel display relative to the upper left corner of the pixel display area. These numbers also correspond to row numbers in the pixel data queue. The numbers across the top of the schematic pixel display in the lower part of FIG. 4 are horizontal coordinates in the pixel display, again relative to the fixed upper left corner position of the pixel display area on the monitor. These horizontal coordinate of a column is in general not equal to its pixel data queue index; the pixel data are rearranged on the display in a manner detailed below.

The computer program which implements the invention accesses this circular queue each time a new value of the time series arrives: first to enter a new column of color pixel data; then to transfer all pixel data in the queue to the color monitor rearranged so as to give the appearance of scrolling action.

Figure 5:
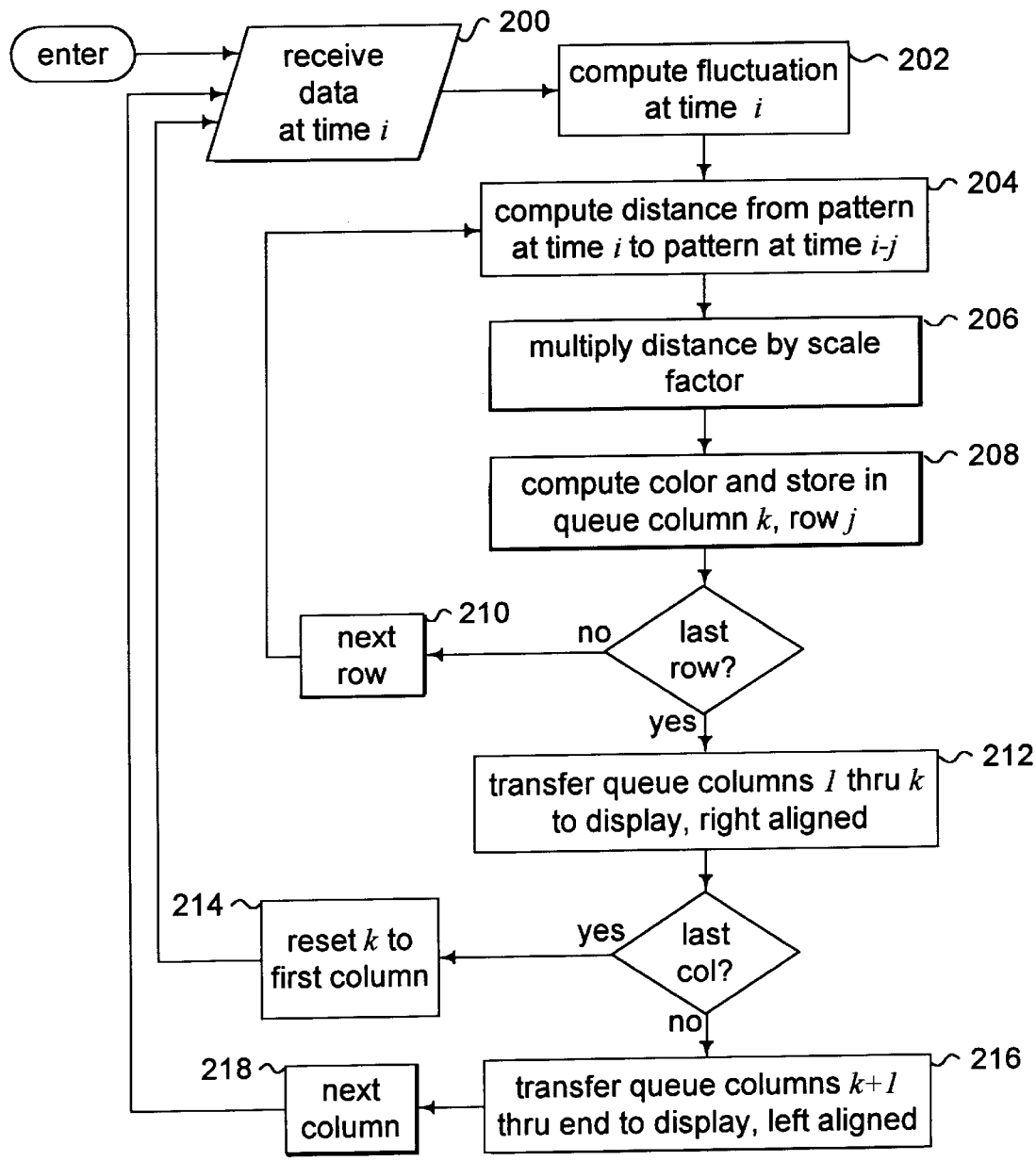
FIG. 5 is a flowchart illustrating the steps performed in practicing the scrolling volatility plot.

FIG. 5 shows a flowchart of a computer program which implements the scrolling volatility plot for real-time data. The program first receives and saves 200 the latest value of the time series; in the example of financial market data, the latest price quote is read from a data feed. The program next computes 202 the fluctuation, that is, either the first difference or the standardized return as defined in step 102 above for the volatility plot. The next steps iterate over rows in a single column of the volatility plot, as described previously for the volatility plot. The program computes 204 the distance from the pattern of fluctuations of length L culminating at $x(t_i)$ to the pattern of fluctuations of the same length culminating at $x(t_{i-j})$ multiplies 206 the distance D by a scaling factor s appropriate to the category of data (or otherwise converts the distance D to a value interpretable as one of a number of colors arranged so that brightness or hotness increases with increasing distance); and stores 208 the color so determined in the pixel data queue in column k and row j, where the value of the pixel data queue column index k is determined from the time index I as follows.

Let the number of columns in the pixel data queue be K. For values of I less than K, the pixel data queue column index k is equal to the time index I. The pixel data queue is intended to hold color pixel data for only part of the time series; thus the time index I will soon exceed the value K For I equal to K+1, the pixel data queue column index k is reset to one. In general, the value of k is incremented by one for each new value of the time series; and whenever k reaches the value K+1 it is reset to one.

After completing a row of column k in the pixel data queue, the program advances 210 to the next row and repeats steps 204 through 208 until the last row of column k is done. The program then transfers the color pixel data in the queue to the color monitor. This transfer is done in two steps, as indicated in FIG. 4.

Pixel Data Transfer to Display

In the example in FIG. 4, color pixel data have just been entered into the queue in column five, that is, the value of k is five. The data now in the queue comprise two blocks. Columns one through k in the queue represent the most recent times; this block is therefore transferred 212 to the monitor in one operation, aligned so that column k of the queue is placed on the monitor in the position reserved for the rightmost column of the scrolling volatility plot image.

Once every K times, the value of k will equal K, and the transfer of data from the queue to the display will already be complete; that is, in these special cases, the second block of data in the queue is empty. In such cases, the program returns to receive 200 the next data after resetting 214 the value of k to one for the next data.

In all other cases, there is a second non-empty block of older data in the queue, stored in columns with index greater than k. The program transfers 216 this second block of color pixel data to the display in a second operation, aligned so that column k+1 of the queue is placed on the monitor in the position reserved for the leftmost column of the scrolling volatility plot image. The program then increases 218 the value of k to k+1 for the next data, and returns to receive 200 the next data.

For the first L+1 time steps, if no archived historical data are used, there will be insufficient data to form any previous patterns of length L for comparison. As discussed above for missing data in the volatility plot, the corresponding pixels or small squares may be left unmarked, for example by applying the color black to the display. For time step L+2, only the first row of the scrolling volatility plot will be marked; for step L+3, only the first two rows are marked; and so on.

Advantages

This method of managing and displaying pixel data has the advantage of achieving a rapid and efficient updating of the volatility plot display, creating the appearance of a smooth scrolling action, while always presenting the most recent data at a fixed location and using the minimum necessary area of the color monitor. The conservation of monitor display area is important for the volatility alert.

The computer program described here implements a preferred embodiment for computer hardware using the Unix (tm) operating system software or a similar operating system which includes the X Window (tm) graphics server software. Those practiced in the art will recognize that similar programs can be written which implement the same or similar methods in other operating system environments, such as Microsoft Windows 95 (tm) or Windows NT (tm).

III. Volatility Alert

A volatility alert is an animated display on a color monitor of many small scrolling volatility plots, each of a different time series, and all displayed on the monitor simultaneously. Each volatility plot is animated by updating as each new observation at the latest time $t_i$ becomes available. An observer watching the numerous scrolling volatility plots displayed simultaneously can very quickly identify those instruments which experience an change in volatility. A sudden increase in volatility will stand out most dramatically on the volatility alert, since is causes hot colors (red, yellow) to appear in that instrument's scrolling volatility plot.

Whenever the user identifies an instrument experiencing a sudden change in volatility, the volatility alert gives the user access to more detailed information about that instrument by, for example, responding when the user points at that instrument's volatility plot with the mouse and clicks a mouse button. The volatility alert then opens a new window on the color monitor showing detailed information about the instrument selected by the user, and responding to further user requests for analysis of the selected instrument.

Since the objective of the volatility alert is timely notification of current volatility, the amount of information presented in each scrolling volatility plot within the volatility alert may be much less that the full information presented in the volatility plot of a single instrument. Evaluating the significance of a sudden change in volatility does require that comparison of current data with a moderately large number of past data be shown. In other words, the subregion of each full volatility plot chosen for display in the volatility alert should be narrow but tall. A useful configuration is 4 to 8 time indices wide and about 30 time indices tall for each instrument. With small squares of size 2 by 2 screen pixels in each volatility plot for clear visibility, and borders several pixels wide to distinguish each instrument, scrolling volatility plots for at least 200 instruments can be displayed on a color monitor simultaneously.

Figure 7:
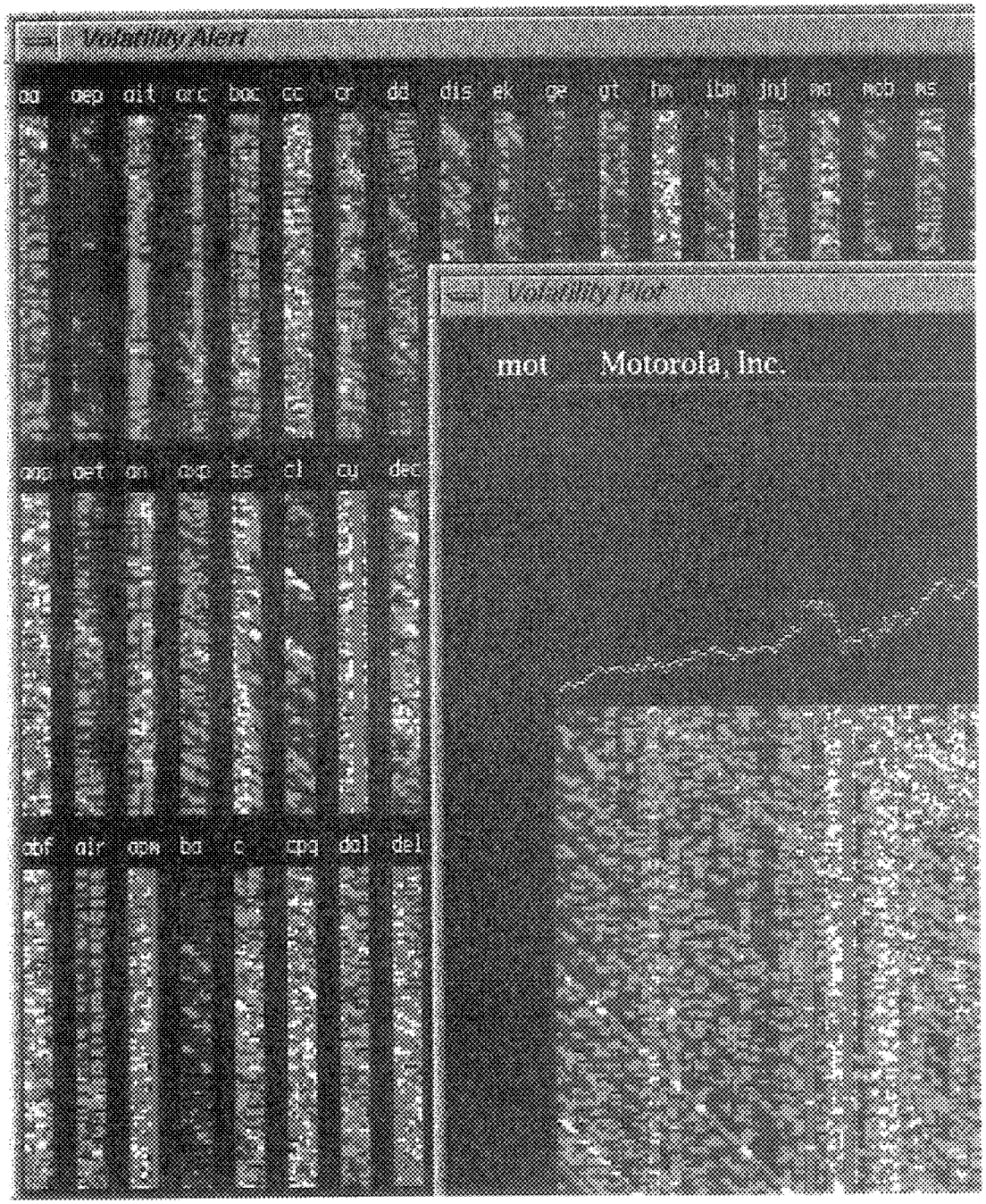
FIG. 7 is a screen capture illustrating the appearance of parts of a volatility plot and a volatility alert on a computer monitor.

FIG. 7 shows a screen capture of part of a volatility alert window displayed on a color monitor, overlapped by a window showing additional information (an extended volatility plot and a conventional graph of price) for one instrument selected from the volatility alert.

Figure 6A:
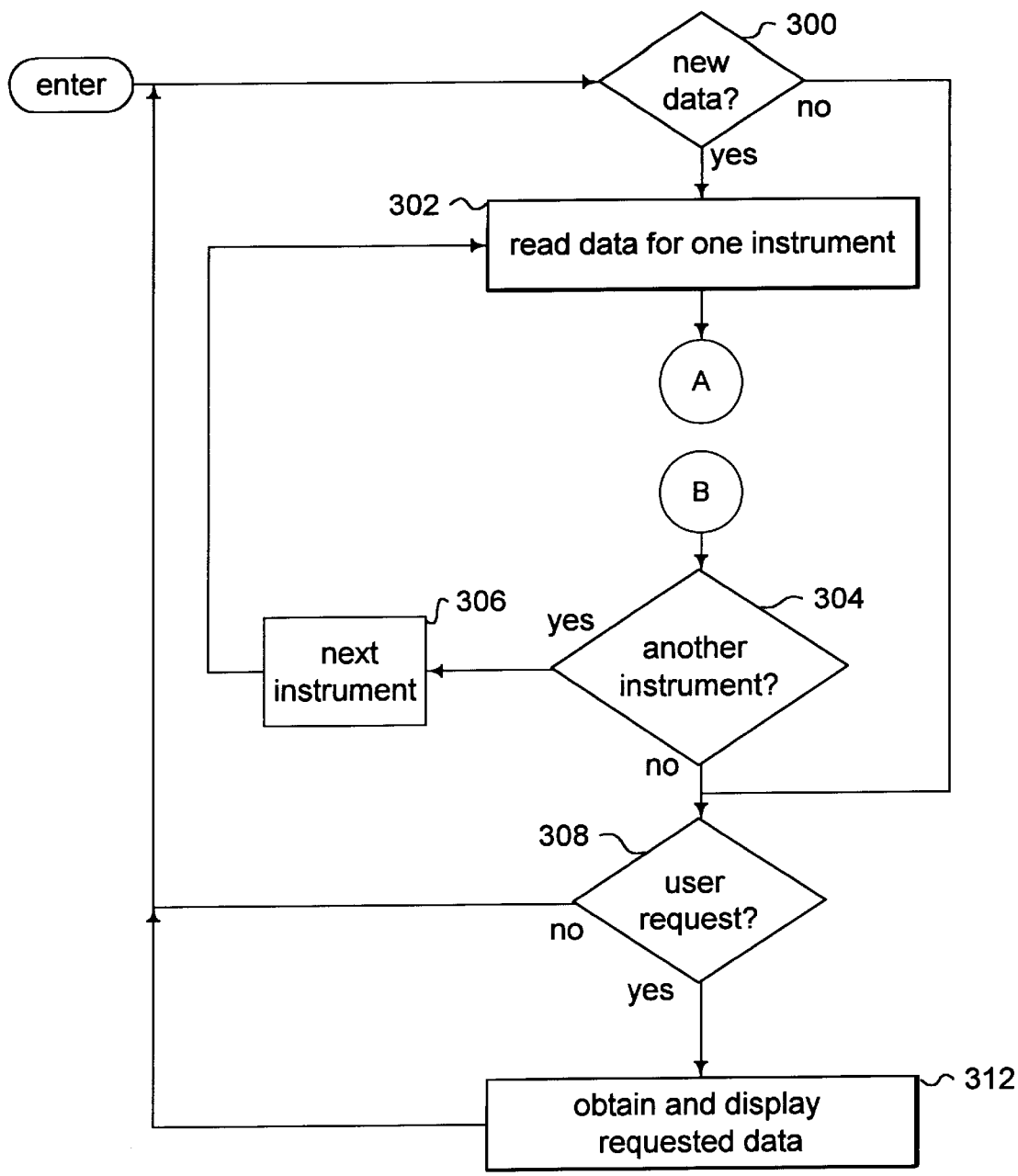
FIGS. 6A and 6B are flowcharts illustrating the steps performed in practicing the volatility alert.
Figure 6B:
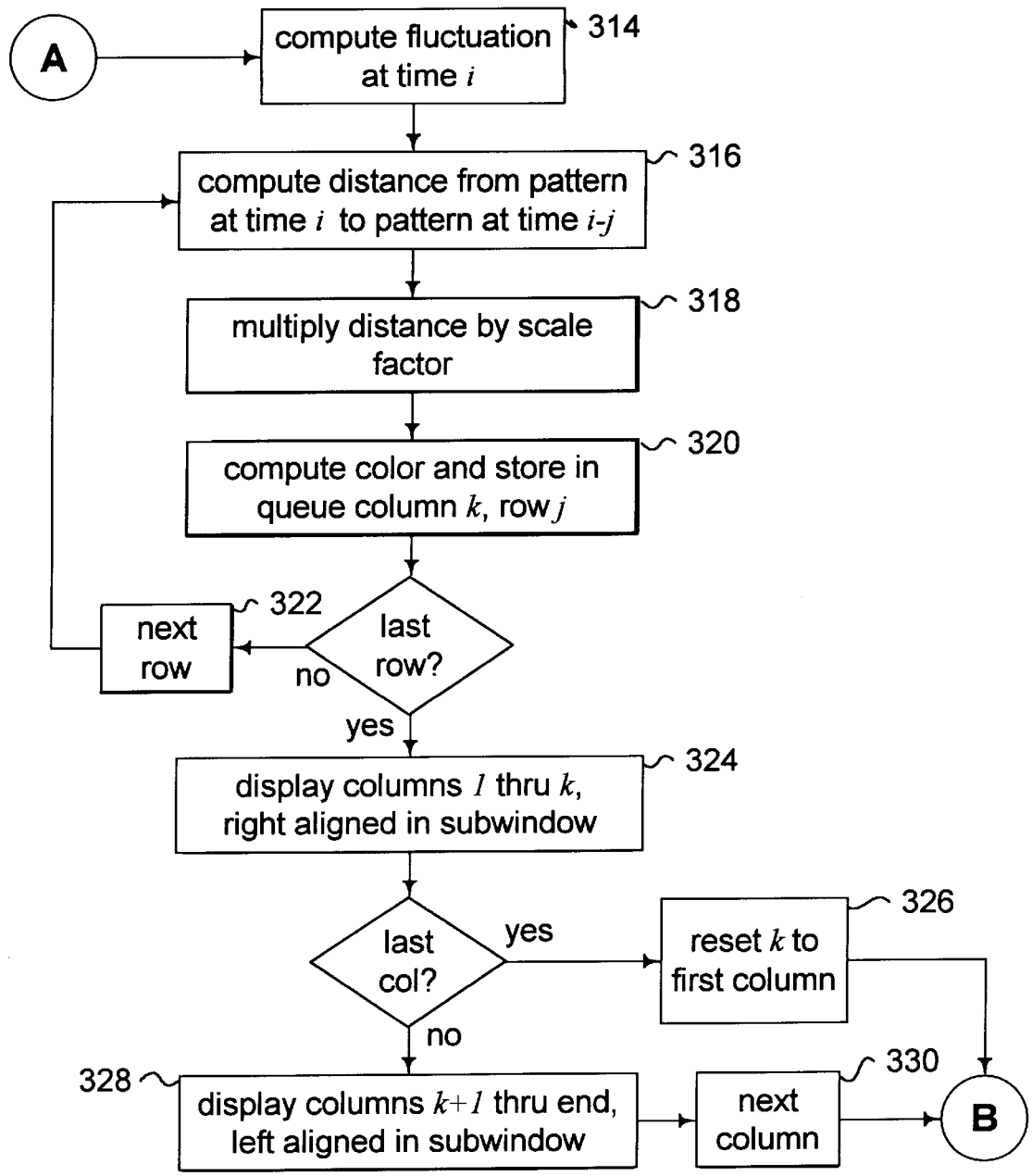

FIGS. 6A and 6B present flowcharts of a computer program which implements the volatility alert. FIG. 6A describes the overall structure of the program, including a simplified block diagram of program response to user input to select an individual instrument for display of additional data. FIG. 6B shows the steps which update the small scrolling volatility plot for each instrument in the volatility alert; these steps are very similar to those shown in FIG. 5 for a single scrolling volatility plot.

The program begins its iterative outer loop by checking 300 for the presence of new data for any of the instruments in the volatility alert. If new data are present, the program reads 302 the new value of the times series for one of the instruments having new data, and goes to A to begin the steps in FIG. 6B which update the scrolling volatility plot for that instrument. After completing those steps for one instrument, program flow returns to B on FIG. 6A, where the program tests 304 whether new data are available for another instrument. If so, the program identifies 306 another instrument with new data available and repeats the steps of reading data 302 for one instrument and updating its small scrolling volatility plot.

When all instruments with new data available have been processed in this manner, the program checks 308 for user input, for example clicking a mouse button to select and instrument for display of additional information. If the user has made a selection, the program identifies 310 which instrument was selected (for example by determining the location of the cursor on the volatility alert display at the time the mouse button was clicked). The program then obtains and displays 312 further information about the instrument selected.

The program updates the display of a small scrolling volatility plot for each instrument by the steps diagramed in FIG. 6B. The program computes 314 the fluctuation, that is, either the first difference or the standardized return as defined in step 102 above for the volatility plot. The program then iterates over rows in a single column of the volatility plot, as described previously for the volatility plot and scrolling volatility plot. The program computes 316 the distance from the pattern of fluctuations of length L culminating at $x(t_i)$ to the pattern of fluctuations of the same length culminating at $x(t_{i-j})$; multiplies 318 the distance D by a scaling factor s appropriate to the category of data (or otherwise converts the distance D to a value interpretable as one of a number of colors arranged so that brightness or hotness increases with increasing distance); and stores 320 the color so determined in a pixel data queue for the instrument being updated, in column k and row j. The pixel data queue column index k cycles over columns of the queue as described for the scrolling volatility plot; that is, the value of k is incremented by one for each new value of the time series; and whenever k reaches the value K+1 (where K is the number of columns in the pixel data queue), k is reset to one.

After completing a row of column k in the pixel data queue for the instrument being updated, the program advances 322 to the next row and repeats steps 316 through 320 until the last row of column k is done. The program then transfers the color pixel data in the queue to the color monitor. This transfer is done in two steps, as described above for the scrolling volatility plot.

The data in columns one through k of the queue for the instrument being updated represent the most recent times; this block is therefore transferred 324 to the monitor in one operation, aligned so that column k of the queue is placed on the monitor in the position reserved for the rightmost column of the scrolling volatility plot image for the instrument being updated.

If the current value of k for the queue of the instrument being updated equals K, and the transfer of data from the queue to the display will already be complete. In such cases, the procedure terminates at B after resetting 326 the value of k for the queue of the instrument being updated to one.

In all other cases, there is a second non-empty block of older data in the queue, stored in columns with index greater than k. The program transfers 328 this second block of color pixel data to the display in a second operation, aligned so that column k+1 of the queue is placed on the monitor in the position reserved for the leftmost column of the scrolling volatility plot image of the instrument being updated. The program then increases 330 the value of k to k+1 for the next data, and terminates at B where program flow resumes on FIG. 6A.

FIG. 7 shows the appearance of part of a volatility alert on a color monitor at one moment in time. The display includes the main window, titled 'Volatility Alert'. Small vertical strips of scrolling volatility plots are displayed in this window for a multitude of instruments, arranged in three rows and a multitude of columns. Directly above each strip of scrolling volatility plot a symbol identifies the instrument whose time series data are displayed in that strip. In the example in FIG. 7, the data are stock prices, and the symbols are the ticker symbols of the stocks.

The image in each small strip will appear to scroll from right to left, with a column of small squares appearing at the right edge of a strip when a new value of its time series becomes available, a column of small squares disappearing from the left edge, and all small squares in between shifted to the left. When an unusually large change in price occurs for an instrument, its strip of volatility plot will show a column of mostly red small squares appearing at the right edge. In FIG. 7, the instrument with symbol 'apm' (in the third column, third row of the volatility alert) has just experienced such a large change in price, and the instrument with symbol 'cy' (in the seventh column, second row of the volatility alert) experienced a large change in price a few steps previously.

When such a column of mostly red small squares appears in any instrument, the user will be able to identify the event readily, and may use a mouse or other pointing device to move a cursor on the display over the strip of volatility plot for that instrument. The user then gives a signal such as clicking a mouse button, and additional data pertaining to the selected instrument will be displayed.

In FIG. 7 the user has just selected the instrument with symbol 'mot' (shares of Motorola, Inc.), and a second window titled 'Volatility Plot' has appeared. In FIG. 7, the 'Volatility Plot' window temporarily obscures part of the 'Volatility Alert' window, including the strip of scrolling volatility plot for 'mot' which was selected by the user.

The second window might show many kinds of information pertaining to a single instrument. As examples, FIG. 7 shows a part of a volatility plot over a much greater range of time, together with part of a conventional graph of prices. The image in the volatility alert of the small strip of volatility plot for the selected instrument will appear duplicated in the upper right corner of the extended volatility plot (which lies beyond the right edge of FIG. 7).

The aforementioned software resides in at least one storage medium of a computer which comprises at least one storage medium, at least one CPU, a power means, and an operating system. The storage medium may optionally be a hard drive, floppy disk, optical disk, CD rom, tape, Random Access Memory and/or cache.

While the invention has been illustrated and described as embodied in a extended volatility plotting programs, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A computer software system for displaying time series data as an image in which one axis represents sequential time and a second axis represents an offset in time from the time represented by said first axis on a display device, wherein the computer software resides on a computer which comprises at least one storage medium, at least one CPU, a power means, and an operating system, the computer software system comprising the steps of:
   A) reading data from archive after entering;
   B) computing fluctuations/first differences or standardized returns;
   C) computing distance from fluctuation pattern at time I to fluctuation pattern a time I-j;
   D) multiplying distance by scale factor;
   E) computing color from scaled distance so that (i) the colors with hues from red to green are assigned to values of the scaled distance greater than the median of all scaled distance values encountered in the time series, while colors with hues from green to blue or black color are assigned to values of the scaled distance smaller than the median value, and (ii) at least two readily distinguishable colors are assigned to distinguish two different intervals of scaled distance above the median;
   F) applying the color to column I, row j;
   G) determining that row j is not the last row and increasing j by one; and
   H) repeating steps C through F.

2. The computer software system for displaying time series data as claimed in claim 1 further comprising the steps of:
   I) determining that row j is the last row, determining that column I is not the last column, and increasing I by one and resetting j to the first row;
   J) repeating steps C through H; and
   K) determining that row j is the last row, determining that column I is the last column and sending image data to display and exiting.

3. A computer software system for displaying time series data as a color image in which one axis of said image represents sequential time and a second axis represents an offset in time from the time represented in said first axis, wherein the computer software resides on a computer which comprises at least one storage medium, at least one CPU, a power means, and an operating system, the computer software system comprising the steps of:
   A) receiving data at time I from data feed after entering;
   B) computing fluctuation at time I;
   C) computing distance from fluctuation pattern at time I to fluctuation pattern at time I-j;
   D) multiplying distance by scale factor;
   E) computing color from scaled distance so that (i) the colors with hues from red to green are assigned to values of the scaled distance greater than the median of all scaled distance values encountered in the time series, while colors with hues from green to blue or black color are assigned to values of the scaled distance smaller than the median value, and (ii) at least two readily distinguishable colors are assigned to distinguish two different intervals of scaled distance above the median;
   F) applying the color to column k, row j;
   G) storing color in pixel data queue column k, row j;
   H) determining row j is NOT the last row and changing j to next row in the queue; and
   I) repeating steps B thru G.

4. The computer software system for displaying time series data as claimed in claim 3 further comprising the steps of:
   J) determining row j IS the last row and transferring pixel queue columns 1 thru k to display, right aligned;
   K) determining that k IS the rightmost column in the queue and resetting k to the leftmost column in the queue;
   L) repeating steps A thru J.

5. The computer software system for displaying time series data as claimed in claim 4 further comprising the steps of:
   determining k is NOT the rightmost column in the queue and transferring pixel queue columns k+1 thru end of display, left aligned;
   moving k one column to the right in the queue; and
   repeating steps A thru J.

6. A computer software system for displaying time series data as a color image in which one axis of said image represents sequential time and a second axis represents an offset in time from the time represented in said first axis, wherein the computer software resides on a computer which comprises at least one storage medium, at least one CPU, a power means, and an operating system, the computer software system comprising the steps of:
   A) entering and determining that new data IS present and reading data for one instrument;
   B) computing fluctuation at time I;
   C) computing distance from fluctuation pattern at time I to fluctuation pattern at time I-j;
   D) computing color from scaled distance so that (i) the colors with hues from red to green are assigned to values of the scaled distance greater than the median of all scaled distance values encountered in the time series, while colors with hues from green to blue or black color are assigned to values of the scaled distance smaller than the median value, and (ii) at least two readily distinguishable colors are assigned to distinguish two different intervals of scaled distance above the median;
   E) applying the color to column k, row j;
   F) determining that row j is NOT the last row and proceeding to next row in queue;
   G) determining that row j IS the last row and transferring pixel queue columns 1 thru k to display, right aligned in subwindow;
   H) determining that k IS the rightmost column in the queue and resetting k to the leftmost column in queue;
   I) determining that k is NOT the rightmost column in the queue and transferring pixel queue columns k+1 thru end to display, left aligned in subwindow;
   J) moving k one column to the right in the queue;
   K) determining that another instrument IS present and proceeding to the next instrument; and
   L) repeating steps A thru K.

7. A computer software system for displaying time series data as an image in which one axis represents sequential time and a second axis represents an offset in time from the time represented by said first axis on a display device, wherein the computer software resides on a computer which comprises at least one storage medium, at least one CPU, a power means, and an operating system, the computer software system comprising the steps of:

A) reading data from archive after entering;
B) computing fluctuations/first distances or standardized returns;
C) computing distance from fluctuation pattern at time I to fluctuation pattern a time I-j;
D) multiplying distance by a scale factor, whose value is such that the resulting scaled distance is (i) less than one for at least ten percent of all scaled distance values encountered in the time series, and is (ii) greater than one and less than two for at least ten percent of all scaled distance values encountered in the time series, and is (iii) greater than two for at least twenty percent of all scaled distance values encountered in the time series;
E) assigning a color for scaled distance in such a way that all scaled distance values greater than one but less than two are assigned a color which is readily distinguished from the color assigned for scaled distances greater than two;
F) applying the color to column I, row j;
G) determining that row j is not the last row and increasing j by one; and
H) repeating steps C through F.

8. A computer software system for displaying time series data as an image in which one axis represents sequential time and a second axis represents an offset in time from the time represented by said first axis on a display device, wherein the computer software resides on a computer which comprises at least one storage medium, at least one CPU, a power means, and an operating system, the computer software system comprising the steps of:

A) reading data from archive after entering;
B) computing fluctuations/first distances or standardized returns;
C) computing distance from fluctuation pattern at time I to fluctuation pattern a time I-j;
D) multiplying distance by a scale factor, whose value is such that the resulting scaled distance is (i) less than one when the distance is less than ten percent of the mean of all scaled distance values encountered in the time series, and is (ii) greater than one and less than two for at least ten percent of all scaled distance values encountered in the time series, and is (iii) greater than two for at least twenty percent of all scaled distance values encountered in the time series;
E) assigning a color for scaled distance in such a way that all scaled distance values greater than one but less than two are assigned a color which is readily distinguished from the color assigned for scaled distances greater than two;
F) applying the color to column I, row j;
G) determining that row j is not the last row and increasing j by one; and
H) repeating steps C through F.

9. A computer software system for displaying time series data as a color image in which one axis of said image represents sequential time and a second axis represents an offset in time from the time represented in said first axis, wherein the computer software resides on a computer which comprises at least one storage medium, at least one CPU, a power means, and an operating system, the computer software system comprising the steps of:

A) receiving data at time I from data feed after entering;
B) computing fluctuation at time I;
C) computing distance from fluctuation pattern at time I to fluctuation pattern at time I-j;
D) multiplying distance by scale factor;
E) multiplying distance by a scale factor, whose value is such that the resulting scaled distance is (i) less than one for at least ten percent of all scaled distance values encountered in the time series, and is (ii) greater than one and less than two for at least ten percent of all scaled distance values encountered in the time series, and is (iii) greater than two for at least twenty percent of all scaled distance values encountered in the time series;
F) assigning a color for scaled distance in such a way that all scaled distance values greater than one but less than two are assigned a color which is readily distinguished from the color assigned for scaled distances greater than two;
G) applying the color to column k, row j;
H) storing color in pixel data queue column k, row j;
I) determining row j is NOT the last row and changing j to next row in the queue; and
J) repeating steps B thru H.

10. A computer software system for displaying time series data as a color image in which one axis of said image represents sequential time and a second axis represents an offset in time from the time represented in said first axis, wherein the computer software resides on a computer which comprises at least one storage medium, at least one CPU, a power means, and an operating system, the computer software system comprising the steps of:

A) receiving data at time I from data feed after entering;
B) computing fluctuation at time I;
C) computing distance from fluctuation pattern at time I to fluctuation pattern at time I-j;
D) multiplying distance by a scale factor, whose value is such that the resulting scaled distance is (i) less than one when the distance is less than ten percent of the mean of all scaled distance values encountered in the time series, and is (ii) greater than one and less than two for at least ten percent of all scaled distance values encountered in the time series, and is (iii) greater than two for at least twenty percent of all scaled distance values encountered in the time series;
E) assigning a color for scaled distance in such a way that all scaled distance values greater than one but less than two are assigned a color which is readily distinguished from the color assigned for scaled distances greater than two;
F) applying the color to column k, row j;
G) storing color in pixel data queue column k, row j;
H) determining row j is NOT the last row and changing j to next row in the queue; and
I) repeating steps B thru G.

11. A computer software system for displaying time series data as a color image in which one axis of said image represents sequential time and a second axis represents an offset in time from the time represented in said first axis, wherein the computer software resides on a computer which comprises at least one storage medium, at least one CPU, a power means, and an operating system, the computer software system comprising the steps of:

A) entering and determining that new data IS present and reading data for one instrument;
B) computing fluctuation at time I;
C) computing distance from fluctuation pattern at time I to fluctuation pattern at time I-j;
D) multiplying distance by a scale factor, whose value is such that the resulting scaled distance is (i) less than one for at least ten percent of all scaled distance values encountered in the time series, and is (ii) greater than one and less than two for at least ten percent of all scaled distance values encountered in the time series, and is (iii) greater than two for at least twenty percent of all scaled distance values encountered in the time series;
E) assigning a color for scaled distance in such a way that all scaled distance values greater than one but less than two are assigned a color which is readily distinguished from the color assigned for scaled distances greater than two;
F) applying the colo r to column k, row j;
G) determining that row j is NOT the last row and proceeding to next row in queue;
H) determining that row j IS the last row and transferring pixel queue columns 1 thru k to display, right aligned in subwindow;
I) determining that k IS the rightmost column in the queue and resetting k to the leftmost column in queue;
J) determining that k is NOT the rightmost column in the queue and transferring pixel queue columns k+1 thru end to display, left aligned in subwindow;
K) moving k one column to the right in the queue;
L) determining that another instrument IS present and proceeding to the next instrument; and
M) repeating steps A thru L.

12. A computer software system for displaying time series data as a color image in which one axis of said image represents sequential time and a second axis represents an offset in time from the time represented in said first axis, wherein the computer software resides on a computer which comprises at least one storage medium, at least one CPU, a power means, and an operating system, the computer software system comprising the steps of:

A) entering and determining that new data IS present and reading data for one instrument;
B) computing fluctuation at time I;
C) computing distance from fluctuation pattern at time I to fluctuation pattern at time I-j;
D) multiplying distance by a scale factor, whose value is such that the resulting scaled distance is (i) less than one when the distance is less than ten percent of the mean of all scaled distance values encountered in the time series, and is (ii) greater than one and less than two for at least ten percent of all scaled distance values encountered in the time series, and is (iii) greater than two for at least twenty percent of all scaled distance values encountered in the time series;
E) assigning a color for scaled distance in such a way that all scaled distance values greater than one but less than two are assigned a color which is readily distinguished from the color assigned for scaled distances greater than two;
F) applying the color to column k, row j;
G) determining that row j is NOT the last row and proceeding to next row in queue;
H) determining that row j IS the last row and transferring pixel queue columns 1 thru k to display, right aligned in subwindow;
I) determining that k IS the rightmost column in the queue and resetting (326) k to the leftmost column in queue;
J) determining that k is NOT the rightmost column in the queue and transferring pixel queue columns k+1 thru end to display, left aligned in subwindow;
K) moving k one column to the right in the queue;
L) determining that another instrument IS present and proceeding to the next instrument; and
M) repeating steps A thru L.

\* \* \* \* \*

UNITED STATES PATENT AND TRADEMARK OFFICE
CERTIFICATE OF CORRECTION

PATENT NO. : 6,195,103 B1
DATED : February 27, 2001
INVENTOR(S) : Hugh Bruce Stewart Page 1 of 1

It is certified that error appears in the above-identified patent and that said Letters Patent is hereby corrected as shown below:

Column 1, Line 7, please delete "is a continuation of the" and insert --claims the benefit of U.S.-- in its place.

Signed and Sealed this

Fifth Day of June, 2001

*Attest:*

*Attesting Officer*

NICHOLAS P. GODICI
*Acting Director of the United States Patent and Trademark Office*